United States Patent
Schulz et al.

(10) Patent No.: US 10,153,641 B2
(45) Date of Patent: Dec. 11, 2018

(54) EXTENDING BLACK-START AVAILABILITY USING ENERGY STORAGE SYSTEMS

(71) Applicant: GENERAL ELECTRIC COMPANY, Schenectady, NY (US)

(72) Inventors: Wayne Allen Schulz, Binghamton, NY (US); Douglas Gene Austin, Schenectady, NY (US); Bennett Steven Sheron, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 15/444,690

(22) Filed: Feb. 28, 2017

(65) Prior Publication Data
US 2018/0248379 A1    Aug. 30, 2018

(51) Int. Cl.
| | | |
|---|---|---|
| *H02J 1/00* | (2006.01) | |
| *H02J 3/14* | (2006.01) | |
| *H02J 3/38* | (2006.01) | |
| *H02J 13/00* | (2006.01) | |
| *H02J 3/32* | (2006.01) | |
| *H02J 11/00* | (2006.01) | |
| *H02J 3/40* | (2006.01) | |

(52) U.S. Cl.
CPC .............. *H02J 3/382* (2013.01); *H02J 3/32* (2013.01); *H02J 3/383* (2013.01); *H02J 3/386* (2013.01); *H02J 11/00* (2013.01); *H02J 13/0096* (2013.01); *H02J 3/40* (2013.01); *H02J 2003/388* (2013.01)

(58) Field of Classification Search
CPC .. H02J 3/382; H02J 3/383; H02J 3/386; H02J 13/0096

USPC .......................................................... 307/31
See application file for complete search history.

(56) References Cited

U.S. PATENT DOCUMENTS

| 7,078,825 B2 | 7/2006 | Ebrahim et al. |
|---|---|---|
| 8,008,794 B2 | 8/2011 | Edenfeld |
| (Continued) | | |

FOREIGN PATENT DOCUMENTS

| WO | 2006094128 A2 | 9/2006 |
|---|---|---|
| WO | 2016126263 A1 | 8/2016 |

OTHER PUBLICATIONS

PCT Search Report and Written Opinion issued in connection with corresponding PCT Application No. PCT/US2018/018085 dated Mar. 28, 2018.

*Primary Examiner* — Carlos Amaya
(74) *Attorney, Agent, or Firm* — Ernest G. Cusick; Frank A. Landgraff

(57) ABSTRACT

Systems and methods for extending black-start availability using energy storage systems can be provided. In one example implementation, a method includes detecting, by one or more controllers, a disconnection of the power system from a power grid; obtaining, by the one or more controllers, data indicative of the amount of energy present in a first energy storage system; obtaining, by the one or more controllers, data indicative of an amount of energy associated with powering one or more loads coupled to the power system; and determining, by the one or more controllers, to activate the auxiliary power source based at least in part on the amount of energy present in the first energy storage system and the amount of energy associated with powering the one or more loads.

20 Claims, 5 Drawing Sheets

(56) References Cited

U.S. PATENT DOCUMENTS

| | | |
|---|---|---|
| 8,116,915 B2 | 2/2012 | Kempton |
| 9,054,619 B2 | 6/2015 | Marken |
| 2012/0068541 A1* | 3/2012 | Anderson ............... H02J 9/061 |
| | | 307/66 |

* cited by examiner

EXTENDING BLACK-START AVAILABILITY USING ENERGY STORAGE SYSTEMS

FIELD

The present subject matter relates generally to energy storage systems and, more particularly, to systems and methods for extending black-start availability using energy storage systems.

BACKGROUND

Energy storage systems have become increasingly used in conjunction with power plants as an auxiliary power source. Energy storage systems are unique in that energy storage systems have the ability to both deliver and reserve energy for particular utility grid or power plant services. Energy storage systems are used in a variety of applications, such as providing emergency back-up power, or providing consistent power from variable energy sources, such as wind, solar, or other variable energy sources. In many applications, energy storage systems can include one or more energy storage devices, such as batteries, stored in an enclosure, such as a containerized, purpose-built enclosure, a stand-alone building, or an enclosed space within a stand-alone building.

Various planned or unplanned events can cause a power plant to lose power. Power plants can black-start by using an energy storage system, such as a battery energy storage system, to satisfy requests for power. However, an energy storage system has a fixed energy storage capacity and is available for a finite period of time during which the energy storage system is capable of providing power to the power plant and capable of black-starting a power system.

BRIEF DESCRIPTION

Aspects and advantages of embodiments of the present disclosure will be set forth in part in the following description, or can be learned from the description, or can be learned through practice of the embodiments of the present disclosure.

One example aspect of the present disclosure is directed to method for using an energy storage system to black-start a power system. The method includes detecting, by one or more controllers, a disconnection of the power system from a power grid; obtaining, by the one or more controllers, data indicative of the amount of energy present in a first energy storage system; obtaining, by the one or more controllers, data indicative of an amount of energy associated with powering one or more loads coupled to the power system; and determining, by the one or more controllers, to activate the auxiliary power source based at least in part on the amount of energy present in the first energy storage system and the amount of energy associated with powering the one or more loads.

Another example aspect of the present disclosure is directed to a control system. The control system is operable to perform operations. The operations include: detecting a disconnection of a power system from a power grid; obtaining data indicative of the amount of energy present in a first energy storage system; obtaining data indicative of an amount of energy associated with powering one or more loads coupled to the power system; and determining to activate an auxiliary power source based at least in part on the amount of energy present in the first energy storage system and the amount of energy associated with powering the one or more loads.

Another example aspect of the present disclosure is directed to a power system. The power system includes a first energy storage system. The first energy storage system includes a plurality of loads coupled to the power system. The plurality of loads load can include a normal load and a critical load. The system can include an auxiliary power source, such as a generator, gas turbine engine or a second energy storage system. The power system can include a controller. The controller can be operable to perform operations. The operations can include obtaining data indicative of the amount of energy present in the first energy storage system; obtaining data indicative of the amount of energy needed to power the one or more normal loads and the one or more critical loads coupled to the power system; determining to selectively disconnect power to the one or more normal loads coupled to the power system based at least in part on amount of energy required to operate the one or more normal loads, the amount of energy required to operate the critical loads and the amount of energy present in the first energy storage system; determining to activate when the amount of energy present in the storage system is within a threshold of the amount of energy required to operate the critical loads; and sending a control signal to activate the auxiliary power source.

Variations and modifications can be made to these example embodiments. These and other features, aspects and advantages of various embodiments will become better understood with reference to the following description and appended claims. The accompanying drawings, which are incorporated in and constitute a part of this specification, illustrate embodiments of the present disclosure and together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
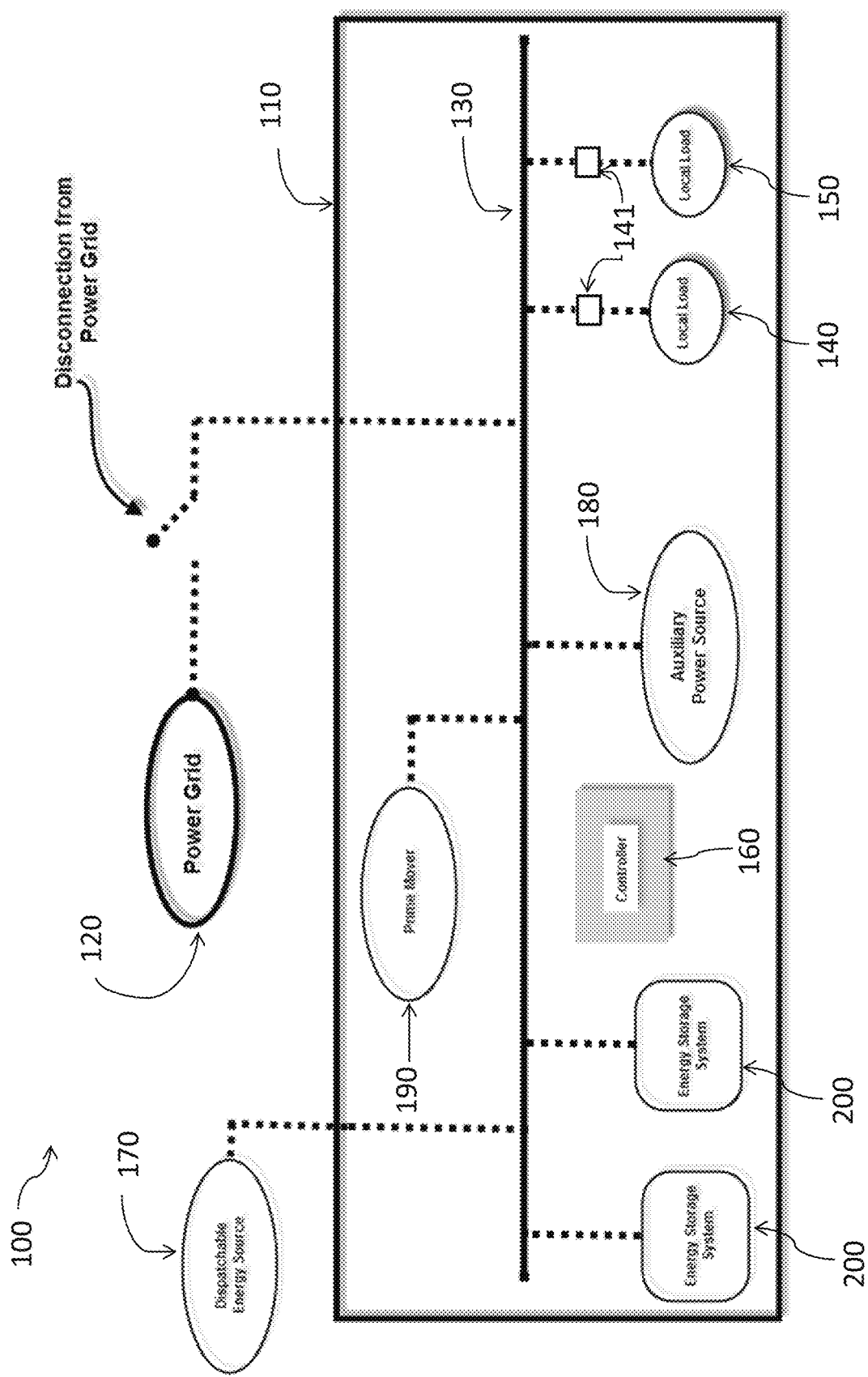
FIG. 1 depicts a diagram of a power system according to example embodiments of the present disclosure.

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for extending the availability of energy storage systems (e.g., a battery energy storage system (BESS)) for black-starting power plant with no grid support. The BESS can include a plurality of battery storage devices and one or more power converters. The BESS can be used to supply power to a power plant in response to power grid loss such that the power plant experiences reduced periods of inoperability. The energy storage system can also be utilized to black-start (e.g., start without connectivity to the grid) an auxiliary power source, such as a gas turbine (GT) engine or generator. The auxiliary power source, in some embodiments, can be an generator or a second energy storage system (e.g., a second battery energy storage system (BESS)), which can be operated as a longer term source of power for the power plant. The auxiliary power source can be used to start the prime mover of the power plant and/or can be used to restore power to the power grid. The first energy storage system has a fixed stored energy capacity. As a result the first energy storage system is available for a finite period of time during which the first energy storage system is capable of providing power to the power plant and/or black-starting the auxiliary generator.

When using an energy storage system to provide power to the power plant and to provide black-start capabilities, it may not be desirable to immediately black-start the auxiliary power source (e.g., a gas turbine engine or other generator). Black-starting a gas turbine engine or other generator in response to every occurrence of power grid loss or fully discharging the energy storage system may cause unnecessary wear or damage to the energy storage system and the gas turbine engine or other generator. Selectively discharging the energy storage system while prioritizing and selectively powering certain loads coupled to the power plant can help avoid unnecessary wear on or damage to the energy storage system and/or the auxiliary power source. Selectively discharging the energy storage system can also extend the period of time during which the energy storage system and auxiliary power source are available to and capable of black-starting the power plant.

According to example embodiments, a power system for black-starting a power plant can be provided with features which monitor various factors affecting both the energy requirements of the power plant and the energy requirements of the loads coupled to the power plant. The power system can also determine the feasibility of performing black-start operations during a period of power grid loss and perform operations to extend the period of time during which the energy storage system is available to power the loads coupled to the power plant and capable of black-starting the power plant.

According to example embodiments of the present disclosure, one or more controllers can be used to determine the energy requirements of the power plant and determine a minimum or near minimum amount of energy required to perform black-start operations. The one or more controllers can also monitor conditions that relate to and may affect the amount of energy available from the energy storage system. For example, if the energy storage system is a BESS, the temperature of the battery storage devices or state of charge of the battery storage devices can be monitored. Based on these and other conditions, controllers can activate and deactivate a determined number of power converters such that the BESS provides energy to the power plant and to the loads coupled to the power plant. This method can extend the amount of time that the energy storage system (BESS) is available to power the power plant and can extend the amount of time that the BESS is available to perform black-start operations.

According to example embodiments of the present disclosure, one or more controllers can be used to monitor the status of dispatchable energy sources that may be coupled to the power plant. Based on the status of the dispatchable energy sources, controllers can activate or deactivate a determined number of power converters such that the energy storage system, alone or in conjunction with the other dispatchable energy sources, provides energy to the power plant and to the loads coupled to the plant.

According to example embodiments of the present disclosure, the one or more controllers can operate one or more switches or other devices to selectively connect and selectively disconnect power to certain loads coupled to the power plant so that the amount of energy available from the energy storage system is sufficient to power the loads coupled to the plant and black-start the power plant. The one or more controllers may also operate one or more switches to selectively connect or disconnect power to certain loads coupled to the power plant such that the energy storage system is maintained at a threshold condition, such as a determined state of charge or determined temperature to prevent degradation.

According to example embodiments of the present disclosure, the loads coupled to the power plant can be prioritized, including as one or more normal loads and one or more critical loads. One or more controllers can be used to automatically activate an auxiliary power source when the amount of energy available from the energy storage system is at a threshold value which represents a minimum or near minimum amount of energy that is associated with powering the one or more critical loads.

In this way, example aspects of the present disclosure can provide a number of technical effects and benefits. For instance, by monitoring and selectively providing power with the energy storage system to the power plant and the loads coupled to the power plant, unnecessary wear or damage to the energy storage system and auxiliary generator can be reduced. Furthermore, the time period during which the energy storage system is capable of black-starting an auxiliary generator can also be extended.

FIG. 1 depicts an example diagram of a power system 100 wherein the power plant 110 is disconnected from the power grid 120 and the power system 100 includes one or more energy storage systems 200. The power system 100 further includes one or more loads coupled to the local AC grid 130 of the power plant 110. The one or more loads coupled to the local AC grid 130 can include one or more normal loads 140 and one or more critical loads 150. The power system 100 further includes one or more controllers 160. The one or more controllers include one or more processors 404 and one or more memory devices 406 (see FIG. 4). The one or more memory devices 406 store instructions. The one or more processors 404 can execute the instructions and cause the one or more controllers 160 to perform operations to detect a disconnection of the power plant 110 from a power grid 120.

In response to detecting a disconnection of the power plant 110 from the power grid 120, the operations performed by the one or more controllers 160 can include obtaining data indicative of the amount of energy present in the energy storage system 200. The operations performed by the one or more controllers 160 can also include monitoring one or more characteristics of the energy storage systems 200 during a sampling period. In some embodiments, the one or more energy storage systems 200 can be one or more battery energy storage systems (BESS). The BESS can include one or more energy storage devices 210 (see FIG. 2), such as battery storage devices. The one or more controllers 160 can monitor characteristics of the one or more BESS including, the temperature of the battery storage devices or state of charge of the battery storage devices. The one or more controllers 160 can monitor environmental conditions that may affect the one or more energy storage systems 200.

The operations performed by the one or more controllers 160 can include monitoring the status of other dispatchable energy sources 170. The dispatchable energy sources 170 can be selectively activated and selectively deactivated by the one or more controllers 160 (e.g., by sending a control signal to operate a switch) such that the dispatchable energy sources 170 can supply power to the power plant 110 alone or in conjunction with the one or more energy storage systems 200. According to example aspects of the present disclosure, the dispatchable energy sources 170 can include one or more diesel generators, solar panels or wind turbines. Moreover, it will be understood that any other energy sources known and which are capable of being dispatched could be used as a dispatchable energy source 170 without departing from the spirit and scope of this disclosure. Additional dispatchable energy sources 170 can be added to the power system 100 at different points in time.

The operations performed by the one or more controllers 160 can also include selectively utilizing the one or more dispatchable energy sources 170 to supply power to the power plant 110 by monitoring conditions that may affect the dispatchable energy sources 170. For example, the one or more controllers 160 can monitor the amount of fuel available to power a diesel generator. The one or more controllers 160 can monitor environmental conditions that can affect the performance of dispatchable energy sources 170, such as solar panels or wind turbines. The one or more controllers 160 can also monitor weather conditions and weather forecasting to determine whether to utilize the dispatchable energy sources 170 to supply power to the power plant 110. By monitoring conditions that may affect the dispatchable energy sources 170, the one or more controllers 160 can determine whether to selectively utilize the dispatchable energy sources 170 alone, or in conjunction with the one or more energy storage systems 200, to provide power to the power plant 110. Utilizing the dispatchable energy sources 170 can extend black-start availability by reducing the amount of power that is discharged from the energy storage system 200.

As used herein, activating a dispatchable energy source includes coupling the dispatchable energy source to the power system and discharging or obtaining power from the dispatchable energy source. Deactivating a dispatchable energy source includes decoupling the dispatchable energy source from the power system so that the dispatchable energy source does not provide power to or receive power from the power system.

The one or more controllers 160 can monitor conditions that may affect the energy needs of the power system 100. According to example aspects of the present disclosure, the conditions that can be monitored can include the state of the prime mover 190, the state of the dispatchable energy sources 170 and environmental conditions, such as temperature, which may affect the energy requirements of the power plant 110.

According to example embodiments of the present disclosure, the one or more controllers 160 can obtain data indicative of the amount of energy associated with powering one or more loads (e.g., 140 and 150) coupled to the power system 100. The one or more controllers 160 can also determine to activate an auxiliary power source 180 based at least in part on the data indicative of the amount of energy associated with powering the one or more loads (e.g., 140 and 150) and the amount energy present in the energy storage systems 200.

The one or more controllers 160, can also obtain data indicative of one or more characteristics of each of the one or more energy storage devices 200 during the sampling period. The data can be used by the one or more controllers 160 to selectively activate and selectively deactivate the one or more energy storage systems 200 such that the energy stored in each of the energy storage systems 200 remain within a threshold amount (e.g., within 5% state-of-charge). As a result, each of the one or more energy storage systems 200 can remain available to deliver the amount of energy associated with powering the one or more loads (e.g., 140 and 150) coupled to the power plant 110. Other characteristics can include the temperature of the energy storage devices 210. The one or more controllers 160 can selectively activate and selectively deactivate each energy storage system based on the temperature, state of charge, and other characteristics of the energy storage devices 210. Selectively activating and selectively deactivating each energy storage system 200 allows the temperature of the energy storage devices 210 to remain at or below a threshold temperature.

As used herein, activating an energy storage system 200 includes coupling the energy storage system 200 to the power system 100 and discharging power from the energy storage system. Deactivating an energy storage system 200 includes decoupling the energy storage system 200 from the power system 100 so that the energy storage system 200 does not provide power to or receive power from the power system 100.

The operations of the one or more controllers 160, can further include obtaining data indicative of an amount of energy required to operate the one or more normal loads 140 coupled to the power plant 110 based on one or more characteristics of the one or more normal loads 140. According to example aspects of the present disclosure, the normal loads 140 can include systems which are not required to operate the power plant. The normal loads 140 can include HVAC or lighting systems that are associated with areas of the power plant 110 that are unoccupied or are otherwise not in use. The one or more controllers 160 can selectively connect and selectively disconnect power to the one or more normal loads 140, by operating one or more switches 141, based on a comparison of the amount of energy required to operate the one or more normal loads 140 coupled to the power plant 110 and the amount of energy present in the energy storage system 200 to the amount of energy present in the one or more energy storage systems 200 during the sampling period.

The operations performed by the one or more controllers 160 can further include obtaining data indicative of an amount energy required to operate one or more critical loads 150 coupled to the power plant 110 based on one or more characteristics of the critical loads 150 during the sampling period. According to example aspects of the present disclosure, the critical loads 150 can include HVAC systems that are necessary to sustain the energy storage systems 200 at a temperature at which they can operate. The critical loads 150 can include switchgear used for starting the power plant 110. The critical loads can include the one or more controllers 160 or other components needed to activate the auxiliary power source 180 or the one or more controllers 160 or other components needed to black-start the power plant 110. The one or more controllers 160 can selectively connect and selectively disconnect power to the one or more normal loads 140 and the one or more critical loads 150, by controlling one or more switches 141 or other devices, based on a comparison of the amount of energy required to operate the one or more loads coupled to the power plant to the amount of energy present in the energy storage system 200 during the sampling period.

The operations performed by the one or more controllers 160 can further include activating the auxiliary power source 180 when the amount of energy present in the one or more energy storage systems 200 is within a threshold amount of energy associated with powering the one or more critical loads 150. According to example aspects of the present disclosure, the one or more controllers 160 can be used to automatically activate the auxiliary power source (e.g., send a control signal to activate the auxiliary power source) when the amount of energy available from the one or more energy storage systems 200 is at a threshold value which represents a minimum or near minimum amount of energy that must be available to power the one or more critical loads 150 and perform black-start operations for the power plant 110.

Figure 2:
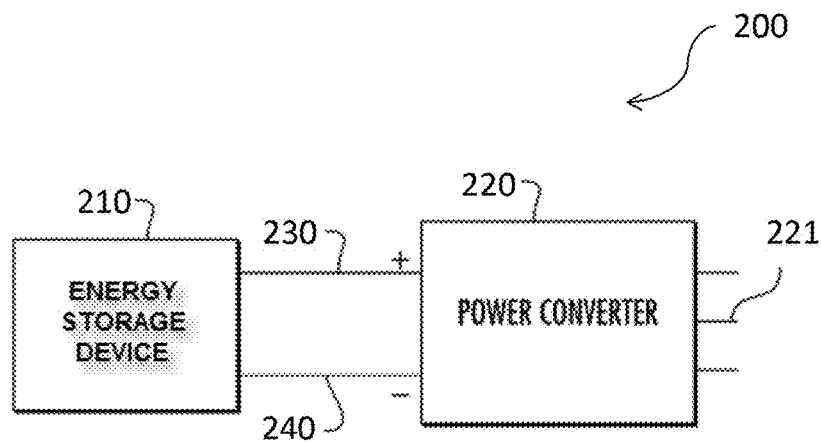
FIG. 2 depicts a diagram of an example energy storage system according to example embodiments of the present disclosure.

FIG. 2 depicts an overview of an example energy storage system 200 according to example embodiments of the present disclosure. As shown, energy storage system 200 includes an energy storage device 210 coupled to a power converter 220. Power converter 220 (e.g., an inverter) can be configured to convert power provided from energy storage device 210 to an alternating current power suitable to supply to a local AC grid 130 (e.g. 50 Hz or 60 Hz power) for the power plant 110. Power converter 220 can include a plurality switching elements (e.g. IGBTs or other switching elements). The switching elements can be controlled, for instance, by one or more controllers 160 (FIG. 1) to regulate power flow in the energy storage system 200.

Energy storage system 200 can be coupled at 221 to the local AC grid 130 (e.g., an AC bus) for the power plant 110. Energy storage system 200 can include a DC bus having positive conductors 230 and negative conductors 240 configured to couple energy storage device 210 to power converter 220. Energy storage system 200 can further include one or more ground conductors (not shown) configured to couple energy storage system 200 to a common reference.

Figure 3:
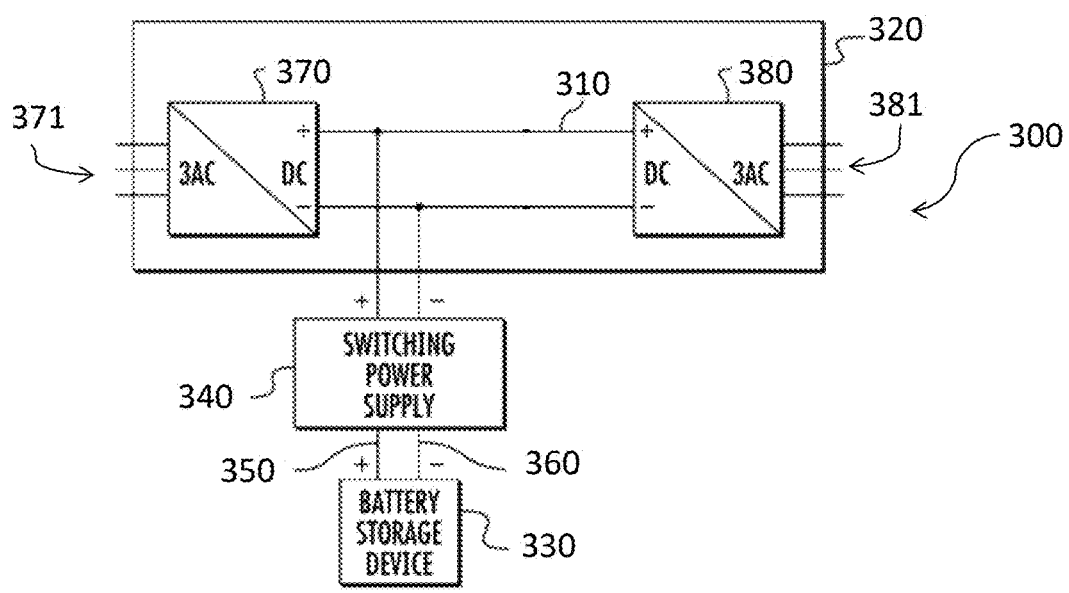
FIG. 3 depicts a diagram of an example energy storage system according to example embodiments of the present disclosure.

FIG. 3 depicts an example battery energy storage system 300 coupled to the DC bus 310 of a two-stage power converter 320 as part of a dispatchable energy source (e.g., a renewable energy source) coupled to the power plant. The battery energy storage system 300 can include a battery energy storage device 330. The battery energy storage device 330 can be coupled to the DC bus 310 via a switching power supply 340, such as a DC to DC converter. The switching power supply 340 can convert the DC power on the DC bus to a DC voltage that is suitable for application to the battery energy storage device 330.

The switching power supply 340 can include a plurality of switching elements (e.g. IGBTs or other switching elements). The switching elements can be controlled, for instance, by one or more controllers 160 (FIG. 1) to regulate power flow in the energy storage system 300.

The battery energy storage system 300 further includes positive conductors 350 and negative conductors 360 coupling battery storage device 330 to the switching power supply 340. In particular, positive conductors 350 can couple the battery storage device 330 to a positive terminal of the switching power supply 340, and negative conductors 360 can couple the battery storage device 330 to a negative terminal of the switching power supply 340. In some implementations, system 300 can further include ground conductors (not shown) coupling the battery storage device 330 to a common reference point.

The battery energy storage system 300 further includes a dispatchable energy source converter 370 which is coupled at 371 to a dispatchable energy source 170 (FIG. 1). The dispatchable energy source converter 370 is coupled DC bus 310 to a local AC grid side inverter 380. The inverter 380 is coupled at 381 to the local AC grid 130 of the power plant 110 (FIG. 1). The power converter 320 and the inverter 370 can be coupled to one or more controllers 160 (FIG. 1) to cause power flow in the power system.

Figure 4:
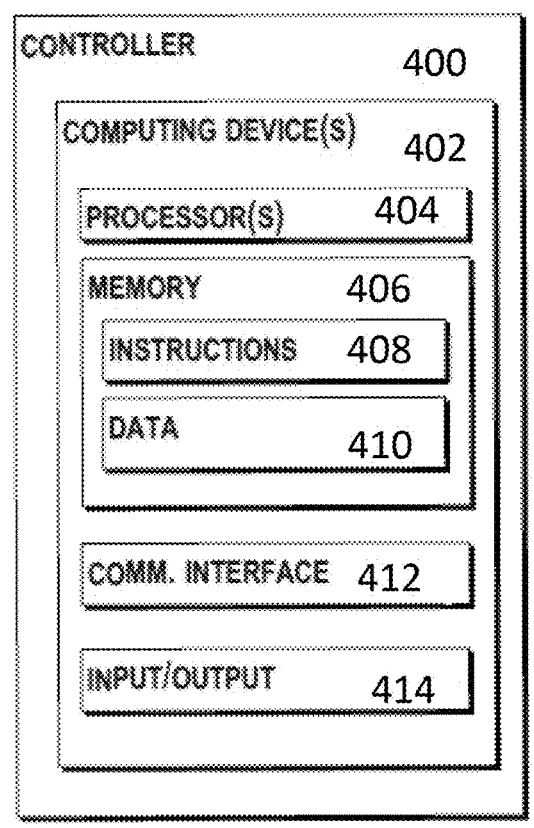
FIG. 4 a block diagram of an example computing system that can be used to implement a controller.

FIG. 4 depicts a block diagram of an example controller 400 that can be used to implement the controller 160 of FIG. 1, or other control devices according to example embodiments of the present disclosure. As shown, the controller 400 can include one or more computing device(s) 402. A computing device 402 can include one or more processor(s) 404, and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for controlling operation of energy storage units to satisfy operations, as described with reference to FIGS. 1-3 and 5-6, and/or any other operations or functions.

The memory device(s) 406 can further store data 410 that can be accessed by the processors 404. For example, the data 410 can include a data associated with operation of energy storage units, such as capacity, deviation limits, current use, current demand, etc., as described herein. The data 410 can include one or more table(s), function(s), algorithm(s), model(s), equation(s), etc. according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components. The one or more computing device(s) 402 can include input and/or output devices 414.

Figure 5:
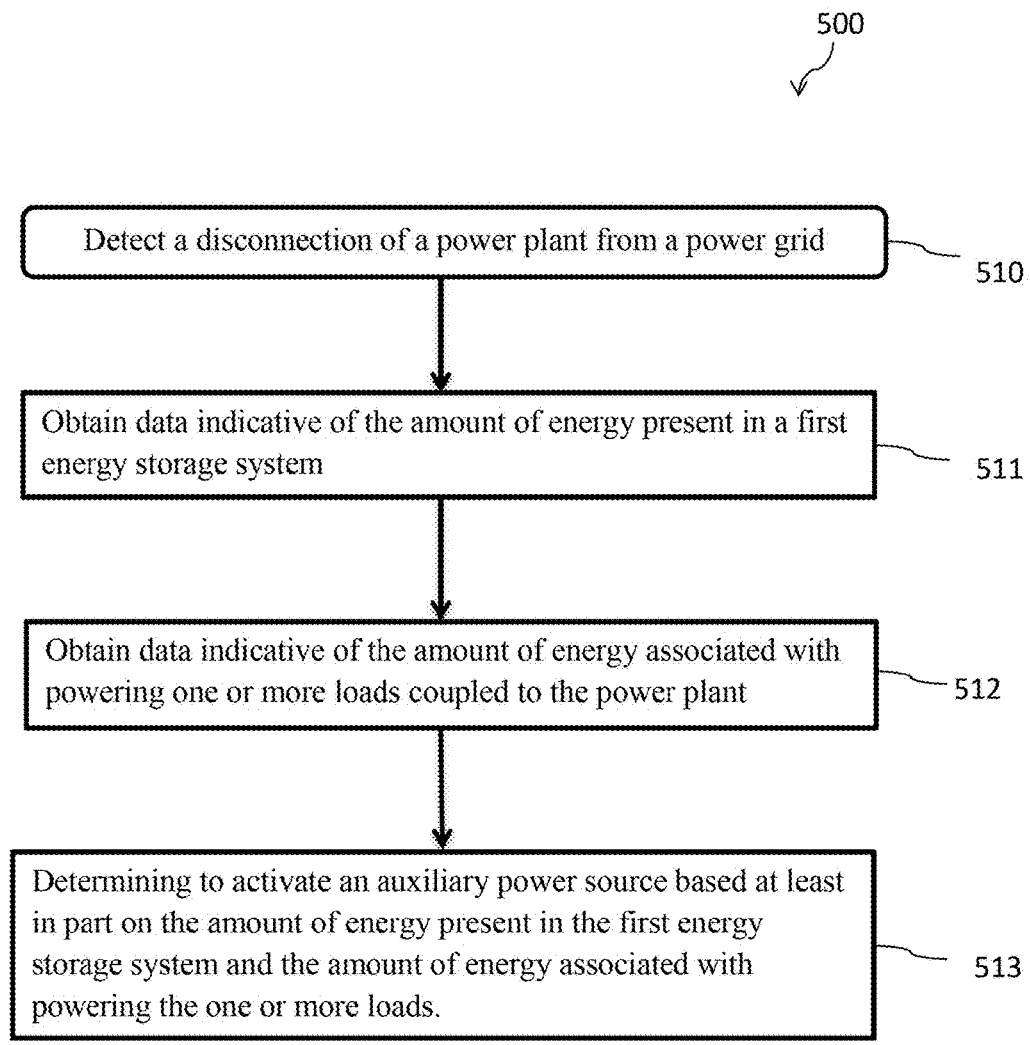
FIG. 5 depicts a flow diagram of an example method for extending black-start availability using energy storage systems according to example embodiments of the present disclosure.

FIG. 5 depicts a flow diagram of an example method 500 according to example embodiments of the present disclosure. Method 500 can be performed by one or more control devices, such as controller 160, or by separate devices. FIG. 5 depicts steps performed in a particular order for purposes of illustration and discussion. Those of ordinary skill in the art, using the disclosure provided herein, will understand that the method discussed herein can be adapted, rearranged, expanded, omitted, performed simultaneously, and/or modified in various ways without deviating from the scope of the present disclosure.

At (510) the method can include detecting a disconnection of a power plant 110 from a power grid 120. At (511) the method can include obtaining data indicative of the amount of energy present in the first energy storage system 200.

At (512) the method can include obtaining data indicative of a threshold amount of energy associated with powering one or more loads coupled to the power system. At (513) the method can include determining to activate an auxiliary power source 180 based at least in part on the amount of energy present in the first energy storage system 200 and the amount of energy associated with powering the one or more loads (e.g., 140 and 150).

Figure 6:
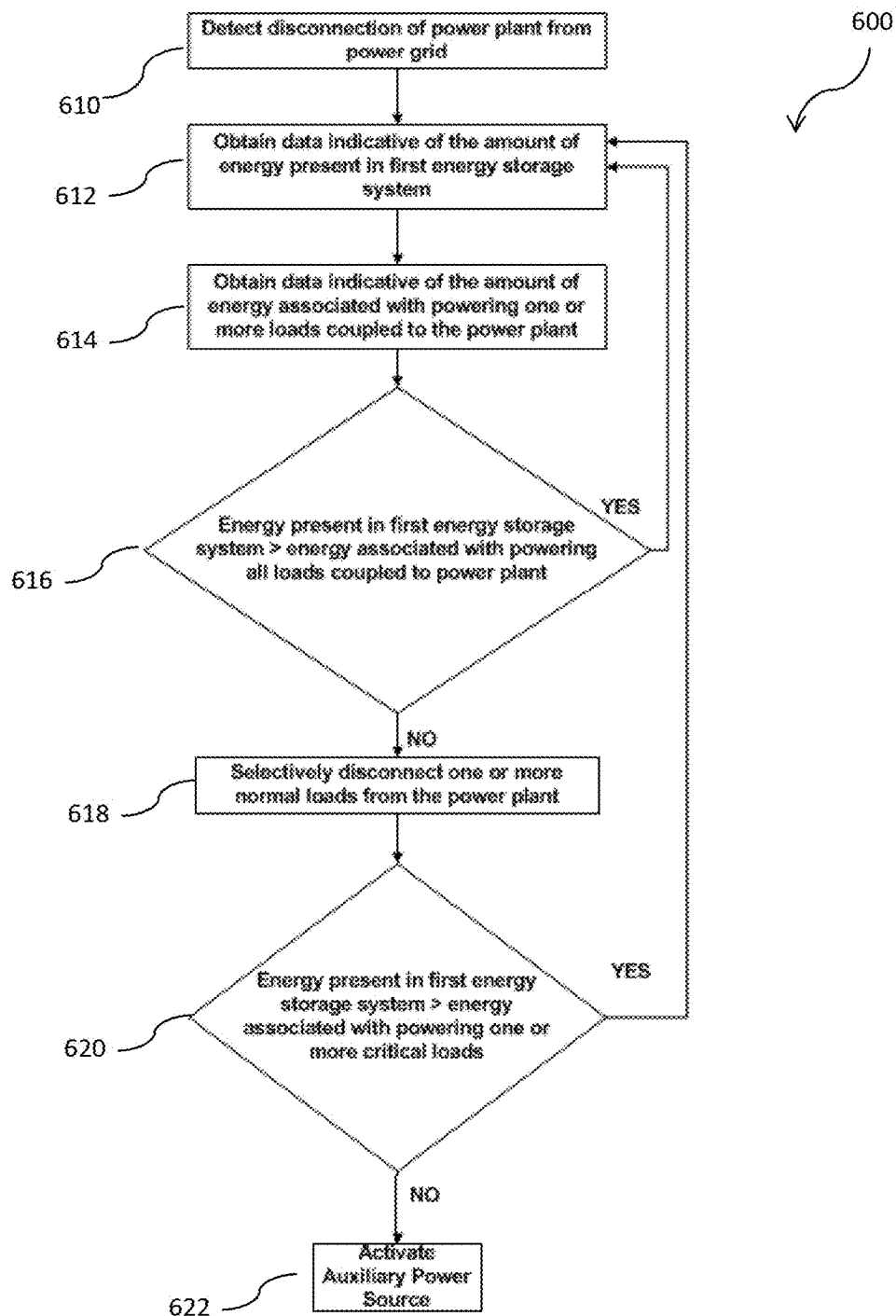
FIG. 6 depicts a method according to example aspects of the present disclosure.

FIG. 6 depicts a flow diagram of an example method (600) according to example embodiments of the present disclosure. FIG. 6 can be implemented using one or more control devices, such as controller 160 of FIG. 1. In addition, FIG. 6 depicts steps performed in a particular order for purposes of illustration and discussion. Those of ordinary skill in the art, using the disclosures provided herein, will understand that various steps of any of the methods disclosed herein can be adapted, modified, omitted, performed concurrently, rearranged, and/or expanded in various ways without deviating from the scope of the present disclosure.

At (610) the method can include detecting a disconnection of a power plant 110 from a power grid 120. At (612) the method can include obtaining data indicative of the amount of energy present in the first energy storage system 200. At (614) the method can include obtaining data indicative of the amount energy required to operate one or more loads, such as normal loads 140 and critical loads 150, coupled to the power plant 110.

At (616) the method can include determining if the amount of energy present in the one or more energy storage systems 200 is greater than the amount of energy required to operate all of the one or more loads coupled to the power plant 110. If the amount of energy present in the one or more energy storage systems 200 is greater than the amount of energy required to operate all of the one or more loads coupled to the power plant 110, the one or more controllers 400, can continue obtaining data indicative of the amount of energy present in the energy storage system 200 at (612). If the amount of energy present in the one or more energy storage systems 200 is less than or equal to the amount of energy required to operate all of the one or more loads coupled to the power plant 110, the method continues at (618).

At (618) the method can include selectively operating one or more switches 141 to disconnect power to the one or more normal loads 140.

At (620) the method can include determining if the amount of energy present in the one or more energy storage system 200 is within a threshold amount of energy associated powering the one or more critical loads 150. If however, the amount of energy present in the one or more energy storage systems 200 is greater than a threshold amount of energy associated with powering the one or more critical loads, the one or more controllers 400, can continue obtaining data indicative of the amount of energy present in the energy storage system 200 at (612). If the amount of energy present in the one or more energy storage systems 200 is less than or equal to a threshold amount of energy associated with powering the one or more critical loads 150 coupled to the power plant 110, the method continues at (622).

At (622) the method can include activating the auxiliary power source. For instance, one or more controllers (e.g., controller 160) can send a control signal to activate the auxiliary power source.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for using an energy storage system to black-start a power system, the method comprising:
   detecting, by one or more controllers, a disconnection of the power system from a power grid;
   obtaining, by the one or more controllers, data indicative of the amount of energy present in a first energy storage system;
   obtaining, by the one or more controllers, data indicative of the amount of energy associated with powering one or more loads coupled to the power system; and
   determining, by the one or more controllers, to activate an auxiliary power source based at least in part on the amount of energy present in the first energy storage system and the amount of energy associated with powering the one or more loads.

2. The method of claim 1, wherein the auxiliary power source is a second energy storage system comprising one or more energy storage devices.

3. The method of claim 1, wherein the first energy storage system is an uninterruptable power supply.

4. The method of claim 3, wherein the auxiliary power source is a gas turbine engine.

5. The method of claim 4, wherein determining to activate the auxiliary power source comprises:
   determining, by the one or more controllers, a period of time during which the first energy storage system is capable of providing power to the power system before it is determined to activate the auxiliary power source; and
   determining, by the one or more controllers, to activate the auxiliary power source based at least in part on the period of time.

6. The method of claim 3, wherein obtaining data indicative of the amount of energy associated with powering the one or more loads is based on one or more characteristics of the power system.

7. The method of claim 6, wherein the one or more loads coupled to the power system comprise one or more normal loads and further comprise one or more critical loads.

8. The method of claim 7, wherein determining to activate an auxiliary power source comprises:
determining, by one or more controllers, to selectively disconnect power to the one or more normal loads based at least in part on the amount of energy required to operate the one or more normal loads, the amount of energy required to operate the one or more critical loads and the amount of energy present in the first energy storage system.

9. The method of claim 8, wherein determining to activate an auxiliary power source comprises:
comparing, by the one or more controllers, the amount of energy associated with powering the one or more critical loads to the amount of energy present in the first energy storage system; and
determining, by the one or more controllers, to activate the auxiliary power source when the amount of energy present in the first energy storage system is within a threshold of the amount of energy associated with powering the one or more critical loads.

10. A control system, the control system configured to perform operations, the operations comprising:
detecting a disconnection of a power system from a power grid;
obtaining data indicative of the amount of energy present in a first energy storage system;
obtaining data indicative of an amount of energy associated with powering one or more loads coupled to the power system; and
determining to activate an auxiliary power source based at least in part on the amount of energy present in the first energy storage system and the amount of energy associated with powering the one or more loads.

11. The control system of claim 10, wherein the auxiliary power source is a second energy storage system comprising one or more energy storage devices.

12. The control system of claim 11, wherein the first energy storage system is an uninterruptable power supply.

13. The control system of claim 12, wherein the auxiliary power source is a gas turbine engine.

14. The control system of claim 13, wherein the operation of determining to activate the auxiliary power source comprises:
comparing the amount of energy associated with powering the one or more loads to the amount of energy present in the first energy storage system; and
determining to activate the auxiliary power source when the amount of energy present in the first energy storage system is within a threshold of the amount of energy associated with powering the one or more loads.

15. The control system of claim 13, wherein the operation of determining to activate the auxiliary power source further comprises determining to selectively disconnect power to the one or more loads based at least in part on the amount of energy required to operate the one or more loads coupled to the power system and the amount of energy present in the first energy storage system.

16. The control system of claim 13, wherein the one or more loads coupled to the power system comprise one or more normal loads and one or more critical loads.

17. The control system of claim 16, wherein the operation of determining to activate the auxiliary power source comprises:
determining, by the one or more controllers, to selectively disconnect power to the one or more normal loads coupled to the power system based at least in part on the amount of energy required to operate the one or more normal loads, the amount of energy required to operate the critical loads and the amount of energy present in the first energy storage system; and
determining, by the one or more controllers, to activate the auxiliary power source when the amount of energy present in the first storage system is within a threshold of the amount of energy required to operate the critical loads.

18. The control system of claim 17, wherein the operations further comprise sending a control signal to activate the auxiliary power source.

19. The control system of claim 18, wherein the operations further comprise sending a control signal to disconnect power to the one or more normal loads.

20. A power system, the power system comprising:
a first energy storage system;
a plurality of loads, wherein the one or more loads comprise one or more normal loads and one or more critical loads;
an auxiliary power source;
a controller operable to perform operations, the operations comprising:
obtaining data indicative of the amount of energy present in the first energy storage system, the first energy storage system comprising one or more energy storage devices;
obtaining data indicative of the amount of energy needed to power the one or more normal loads coupled to the power system;
obtaining data indicative of the amount of energy needed to power the one or more critical loads coupled to the power system;
determining to selectively disconnect power to the one or more normal loads coupled to the power system based at least in part on the amount of energy required to operate the one or more normal loads, the amount of energy required to operate the critical loads and the amount of energy present in the first energy storage system;
determining, by the one or more controllers, to activate the auxiliary power source when the amount of energy present in the first storage system is within a threshold of the amount of energy required to operate the critical loads; and
sending a control signal to activate the auxiliary power source.

* * * * *